(12) United States Patent
Choi

(10) Patent No.: US 7,040,661 B2
(45) Date of Patent: May 9, 2006

(54) FUEL TANK MOUNTING ASSEMBLY

(75) Inventor: Ha Rim Choi, Hwaseong-si (KR)

(73) Assignee: Hyundai Motor Company and Kia Motors Corporation, Seoul (KR)

( * ) Notice: Subject to any disclaimer, the term of this patent is extended or adjusted under 35 U.S.C. 154(b) by 0 days.

(21) Appl. No.: 11/024,835

(22) Filed: Dec. 28, 2004

(65) Prior Publication Data

US 2005/0258630 A1 Nov. 24, 2005

(30) Foreign Application Priority Data

May 24, 2004 (KR) ............. 10-2004-0036902

(51) Int. Cl.
*B60K 15/08* (2006.01)
(52) U.S. Cl. .................................... 280/834
(58) Field of Classification Search .......... 280/834, 280/835
See application file for complete search history.

(56) References Cited

U.S. PATENT DOCUMENTS

| | | | | |
|---|---|---|---|---|
| 4,059,281 A | * | 11/1977 | Evans ..................... 280/834 |
| 4,645,221 A | * | 2/1987 | Benning .................. 280/834 |
| 5,845,940 A | * | 12/1998 | Colburn ................... 280/830 |
| 6,637,706 B1 | * | 10/2003 | Kim et al. ................ 248/154 |
| 6,641,169 B1 | * | 11/2003 | Fukunaga et al. ......... 280/835 |
| 6,896,318 B1 | * | 5/2005 | Marrs et al. ............. 296/191 |

FOREIGN PATENT DOCUMENTS

WO    WO 8203825 A    *  11/1982

* cited by examiner

*Primary Examiner*—Kevin Hurley
(74) *Attorney, Agent, or Firm*—Morgan Lewis & Bockius LLP

(57) ABSTRACT

The fuel tank mounting assembly includes a fuel tank whose front end is pivotally attached to a body frame of a vehicle by means of a hinge member. The fuel tank is further furnished with supporting means at both sides thereof, which restrain the vertical movement of the rear portion of the fuel tank within a predetermined lapse or level in the event of a rear-end collision. The supporting means comprises a guide plate securely fixed to a body frame of a vehicle, guides slideably engaged with the guide plate, a first link member and a second link member whose distal ends are rotatably coupled to the guides and proximal ends are rotatably coupled to a pivot point of the fuel tank, which is disposed at both sides of the fuel tank.

5 Claims, 2 Drawing Sheets

FUEL TANK MOUNTING ASSEMBLY

CROSS REFERENCE TO RELATED APPLICATION

This application is based on, and claims priority to Korean Patent Application No. 2004-0036902,filed on May 24, 2004,the disclosure of which is hereby incorporated by reference.

TECHNICAL FIELD

The present invention generally relates to a fuel tank mounting assembly for a vehicle. More particularly, the fuel tank mounting assembly is capable of preventing secondary collision of the fuel tank with a body frame in the event of a rear-end collision by restraining the horizontal movement of the fuel tank in a fore-and-aft direction of the vehicle.

BACKGROUND

Generally, a fuel tank for a vehicle is attached to a floor panel by means of a supporting band which encircles the fuel tank in a fore-and-aft direction of the vehicle. For example, a conventional fuel tank mounting structure comprises a fuel tank and a supporting band by which the fuel tank is fixed to a floor panel. In the event of a rear-end collision, the rear floor is typically deformed toward the head of a vehicle resulting in loosening the supporting band, so that the rear portion of the fuel tank is drooped downward under its own weight.

However, there is a potential risk of explosion of the fuel tank because the movement of the fuel tank in a fore-and-aft direction of the vehicle is not limited by any fixing means. Namely, the drooped fuel tank may collide with the rear floor protruded toward the fuel tank while pitching back and forth.

SUMMARY

The present invention provides a fuel tank mounting assembly capable of preventing secondary collision of the fuel tank with a body frame or a rear floor in the event of a rear-end collision by restraining the movement of the fuel tank in a fore-and-aft direction of the vehicle.

One embodiment of a fuel tank mounting assembly includes a fuel tank whose front end is pivotally attached to a body frame of a vehicle by means of a hinge member. The fuel tank is further furnished with supporting means at both sides thereof, by which the vertical movement of the rear portion of the fuel tank is restrained within a predetermined level or lapse in the event of a rear-end collision.

Preferably, the supporting means comprises a guide plate securely fixed to a body frame of a vehicle, guides slideably engaged with the guide plate, a first link member and a second link member whose distal ends are rotatably coupled to the guides and proximal ends are rotatably coupled to a pivot point of the fuel tank. The pivot point is disposed at both sides of the fuel tank.

More preferably, the guide plate is furnished with two guide grooves juxtaposed with the front portion and the rear portion thereof.

BRIEF DESCRIPTION OF THE DRAWINGS

The aforementioned aspect and other features of the present invention will be explained in the following detailed description, taken in conjunction with the accompanying drawings, wherein.

DETAILED DESCRIPTION OF PREFERRED EMBODIMENTS

Figure 1:
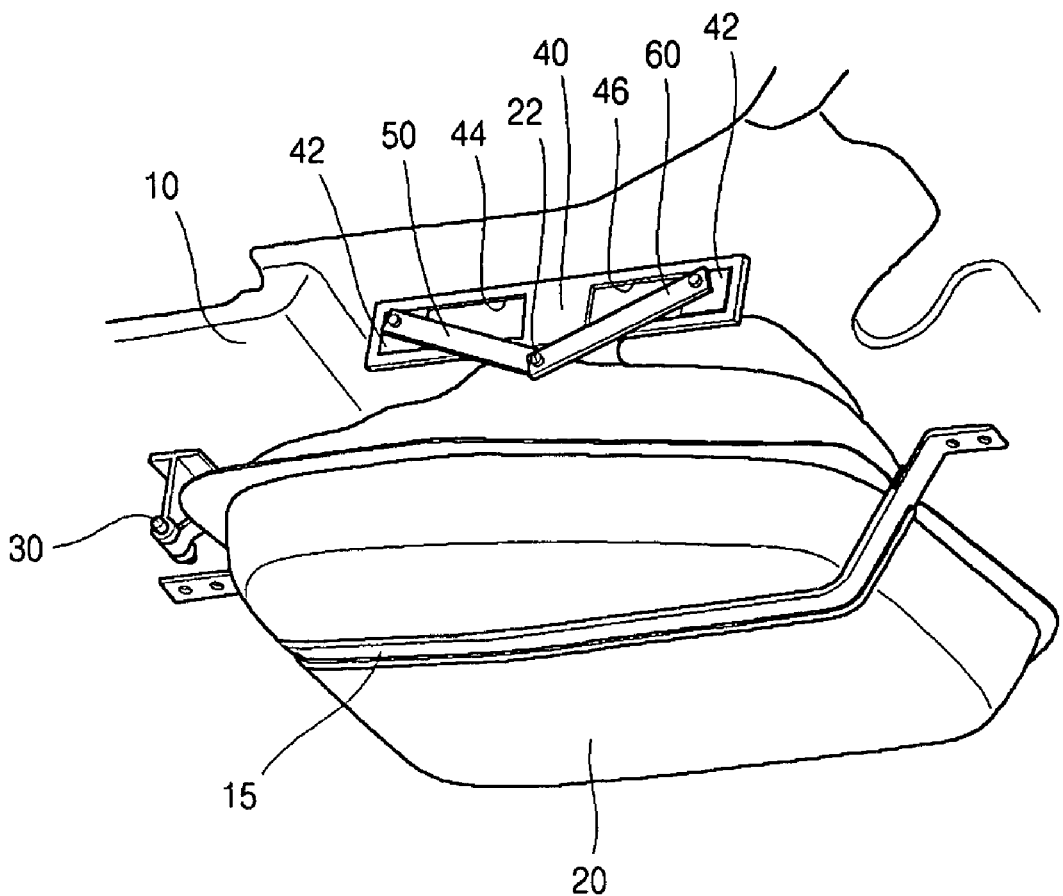
FIG. 1 is a perspective view of a fuel tank mounting assembly according to an embodiment of the present invention.
Figure 2:
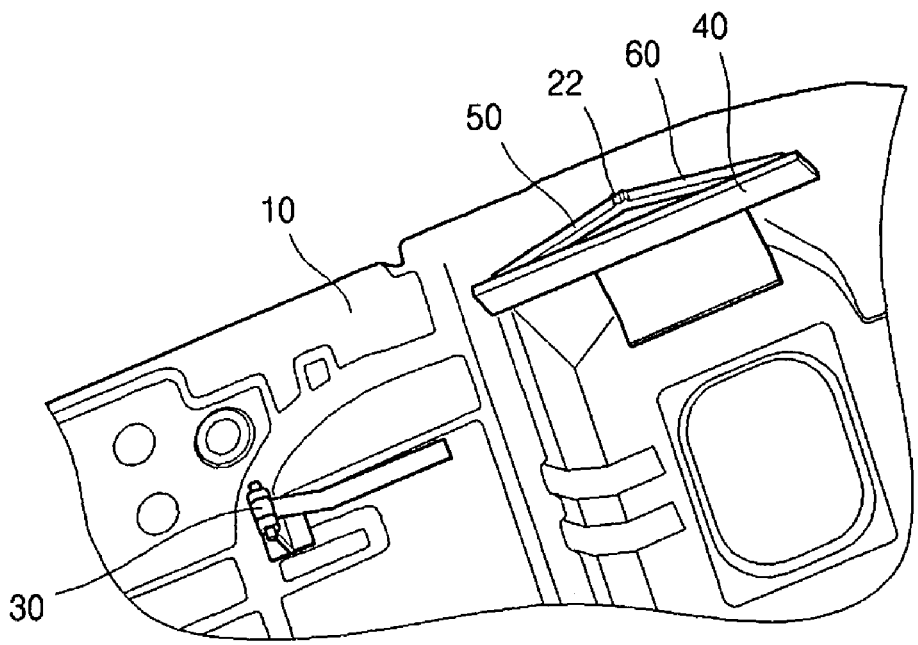
FIG. 2 is a bottom, perspective view of fuel tank mounting assembly according to an embodiment of the present invention.

As shown in FIGS. 1 and 2, the front end of a fuel tank 20 is pivotally fixed to a floor panel 10 of a vehicle by means of a hinge member 30. The hinge member 30 is fixed to the center of the front end of the fuel tank 20 by welding or riveting.

A couple of guide plates 40 are attached to the floor panel 10 in such a manner that guide plates 40 are apart from each other by the width of the fuel tank 20 so that the each guide plate is approximately positioned at both side of the fuel tank 20. The guide plate 40 is provided with two guide grooves 44, 46 which are respectively positioned at a front portion and a rear portion of the guide plate 40. Guides 42 are slideably engaged within the guide grooves 44, 46. In order to operably connect the guides 42 to the fuel tank 20, there is provided a first link member 50 and a second link member 60. The distal ends of the first link member 50 and the second link member 60 are rotatably coupled to the guides 42 that slide within the guide grooves 44,46 of the guide plate 40. The proximal ends of the first link member 50 and the second link member 60 are pivotally coupled to a pivot point 22 located at the side of the fuel tank 20.

Figure 3A:
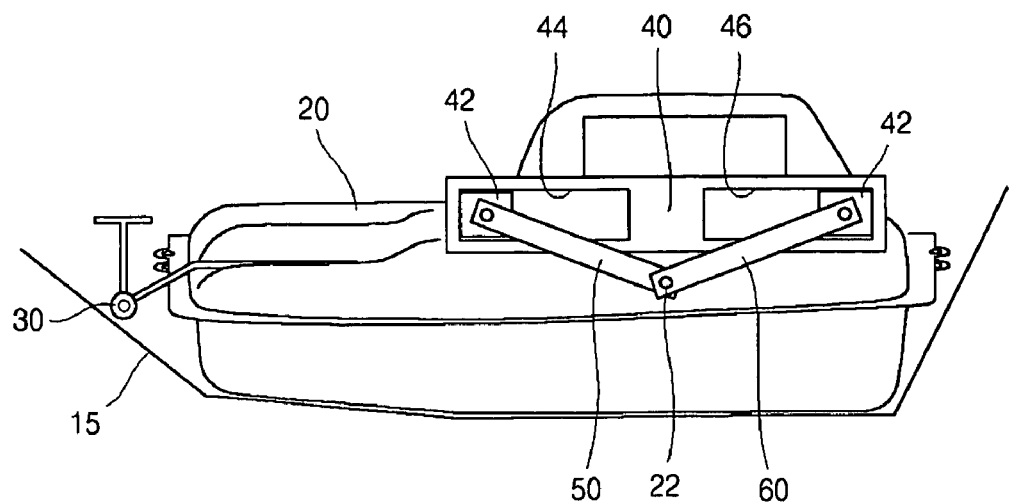
FIGS. 3a and 3b are cross-sectional views showing the movement of a fuel tank mounting assembly according to an embodiment of the present invention in the event of a rear-end collision.
Figure 3B:
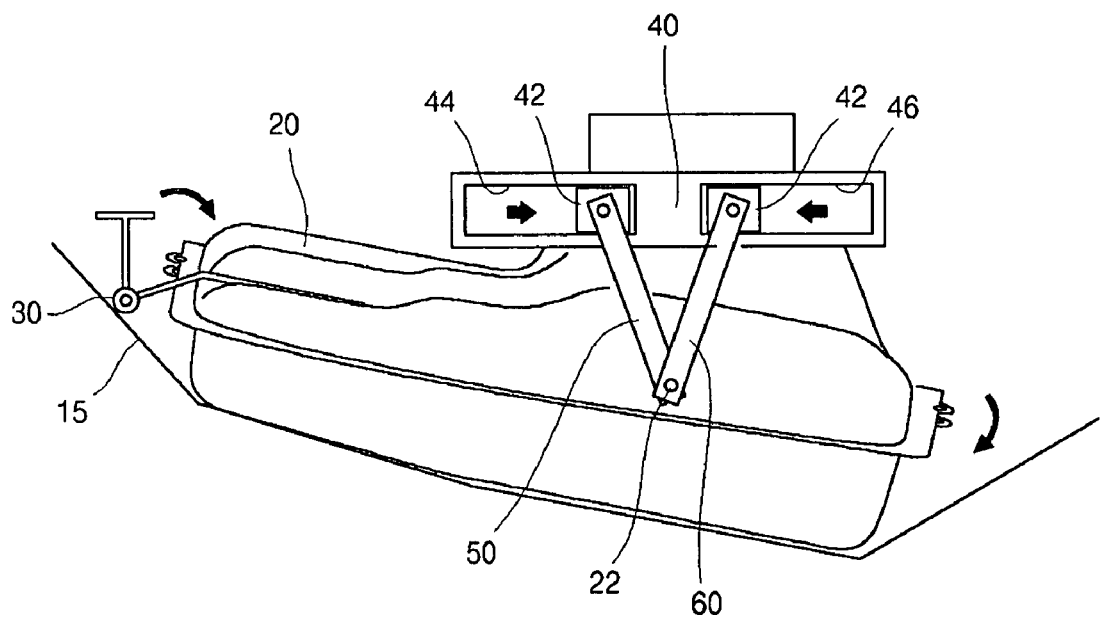

Hereinafter, the operation of the fuel tank mounting assembly according to the preferred embodiment in the event of the rear-end collision is described with reference to the accompanying FIGS. 1, 3a,and 3b.

When an impact is applied to the rear end of a vehicle, the rear portion 10a of the floor panel 10 is pushed forward due to the impact, leading to loosen the supporting band 15. Subsequently, the fuel tank 20, which becomes freed from the restraint of the supporting band 15, pivots upon the hinge member 30 due to its own weigh while the first link member 50 and the second link member 60 limit the rotation of the fuel tank 20 within a predetermined case. Namely, as the fuel tank 20 pivots on the hinge member 30, the first link member 50 and the second link member 60 rotate clockwise and counterclockwise, respectively on the pivot point 22.

Guides 42 coupled to the upper ends of the first link member 50 and the second link member 60 slide toward the center of the guide plate 40, i.e., approach each other. The hinge member 30 holding the front end of the fuel tank 20 allows the rotation of the fuel tank 20, while the first link member 50 and the second link member 60 supporting the fuel tank 20 limit the rotation within a desired range. Therefore, the fuel tank mounting assembly according to the preferred embodiment of the present invention is able to prevent secondary collision of the fuel tank with a body frame in the event of a rear-end collision by restraining the horizontal movement of the fuel tank in a fore-and-aft direction of the vehicle.

As described above, the fuel tank mounting assembly, according to the present invention, is advantageous in that the damage of a fuel tank resulting from a secondary collision with a body frame or the rear floor in the event of a rear-end collision is effectively prevented by means of a hinge member and link members that can constrain the horizontal movement of the fuel tank in a fore-and-aft direction of a vehicle. Consequently, a risk of explosion of the fuel tank caused by fuel leakage can be significantly reduced.

Even though the present invention is described in detail with reference to the foregoing embodiments, it is not intended to limit the scope of the present invention thereto. It is evident from the foregoing that many variations and modifications may be made by a person having an ordinary skill in the present field without departing from the essential concept of the present invention. It is noted that the front and back/rear refer to the normal orientation of a vehicle.

What is claimed is:

1. A fuel tank mounting assembly comprising:
    a fuel tank whose front end is pivotally attached to a body frame of a vehicle by means of a hinge member; and
    a supporting means coupled to both sides of the fuel tank, said supporting means comprising:
        a guide plate securely fixed to a body frame of a vehicle;
        guides slideably engaged within the guide plate;
        a pivot point disposed at both sides of the fuel tank;
        a first link member; and
        a second link member, wherein the distal ends of the first link member and the second link member are rotatably coupled to the guides and proximal ends thereof are rotatably coupled to the pivot point of the fuel tank;
    wherein the supporting means restrains the vertical movement of the rear portion of the fuel tank within a predetermined range in the event of a rear-end collision.

2. The fuel tank mounting assembly according to claim 1, wherein the guide plate is furnished with two guide grooves juxtaposed with the front portion and the rear portion thereof.

3. A fuel tank mounting assembly comprising:
    a fuel tank located below a floor panel;
    a supporting band encircling the fuel tank in a fore-and-aft direction of a vehicle, for attaching the fuel tank to the floor panel;
    a hinge member rotatably connecting the front end of the fuel tank to the floor panel; and
    a supporting means installed at both sides of the fuel tank, wherein in the event of a rear-end collision, the hinge member and the supporting means allow the rotation of the fuel tank within a desired range while restraining the horizontal movement of the fuel tank.

4. The fuel tank mounting assembly according to claim 3, wherein the supporting means comprises:
    a guide plate securely fixed to a body frame of a vehicle;
    guides slideably engaged within the guide plate;
    a pivot point disposed at both sides of the fuel tank;
    a first link member; and
    a second link member, wherein the distal ends of the first link member and the second link member are rotatably coupled to the guides and proximal ends thereof are rotatably coupled to the pivot point of the fuel tank.

5. The fuel tank mounting assembly according to claim 4, wherein the guide plate is furnished with two guide grooves juxtaposed with the front portion and the rear portion thereof.

* * * * *